United States Patent [19]

Stone et al.

[11] Patent Number: 4,496,046
[45] Date of Patent: Jan. 29, 1985

[54] MULTIPLE CHAMBER CONTAINER WITH INNER DIAPHRAGM AND INTERMEDIATE CHAMBER

[75] Inventors: Albert Stone, Buffalo Grove; Edwin Pyde, Desplaines; Peter Carveth, Glen Ellyn, all of Ill.

[73] Assignee: Baxter Travenol Laboratories, Inc., Deerfield, Ill.

[21] Appl. No.: 619,648

[22] Filed: Jun. 15, 1984

Related U.S. Application Data

[63] Continuation of Ser. No. 532,428, Sep. 15, 1983.

[51] Int. Cl.³ .............................. B65D 25/08
[52] U.S. Cl. .................... 206/219; 383/38; 206/222
[58] Field of Search ........ 206/219, 221, 222; 383/38, 39, 40

[56] References Cited

U.S. PATENT DOCUMENTS

| | | | |
|---|---|---|---|
| 2,991,000 | 7/1961 | Spees | 229/51 |
| 3,173,602 | 3/1965 | Cupner | 383/38 |
| 3,182,728 | 5/1965 | Zabriskie | 169/32 |
| 3,186,628 | 6/1965 | Rohde | 229/66 |
| 3,189,174 | 6/1965 | Cormack | 206/63.2 |
| 3,294,227 | 12/1967 | Schneider et al. | 206/219 |
| 3,298,597 | 1/1967 | Bellamy Jr. | 229/55 |
| 3,608,709 | 9/1971 | Pike | 206/47 |
| 3,627,611 | 12/1971 | Bonk | 156/306 |
| 3,756,389 | 9/1973 | Firth | 206/47 |
| 3,874,504 | 4/1975 | Verakas | 206/219 |
| 3,891,138 | 6/1975 | Glas | 383/38 |
| 3,950,158 | 4/1976 | Gossett | 62/4 |
| 3,983,994 | 10/1976 | Wyslotsky | 206/219 |
| 4,000,996 | 1/1977 | Jordan | 62/4 |
| 4,226,330 | 10/1980 | Butler | 206/620 |
| 4,227,614 | 10/1980 | Hollander, Jr. | 206/459 |
| 4,239,105 | 12/1980 | Gilbert | 206/219 |
| 4,276,263 | 6/1981 | Andersen et al. | 206/219 |
| 4,312,473 | 1/1982 | Hoeller | 206/219 |
| 4,402,402 | 9/1983 | Pike | 206/219 |
| 4,458,811 | 7/1984 | Wilkinson | 206/219 |
| 4,465,488 | 8/1984 | Richmond et al. | 604/41 X |

*Primary Examiner*—Joseph Man-Fu Moy
*Attorney, Agent, or Firm*—Robert M. Barrett; Paul C. Flattery; John P. Kirby, Jr.

[57] ABSTRACT

A two chamber container for the separate storage and selective mixing of two components is disclosed. The container includes two outer flexible thermoplastic sheets and an inner, diaphragm sheet. A unique seal line structure is formed between one of the outer sheets and the inner, diaphragm sheet. A peelable barrier structure such as a sheet of aluminum foil with an inner layer of adhesive is secured to the exterior surface of the exterior wall of the container at that portion of the other of the outer sheets which defines one of the chambers of the container. The peelable barrier sheet permits the use of lower cost materials for the remainder of the container structure while both (1) permitting visual inspection of the chamber contents and (2) providing high moisture, gas and light barrier properties.

9 Claims, 28 Drawing Figures

MULTIPLE CHAMBER CONTAINER WITH INNER DIAPHRAGM AND INTERMEDIATE CHAMBER

This application is a continuation of application Ser. No. 532,428, filed Sept. 15, 1984.

There are three related applications filed concurrently herewith, entitled "Selectively Openable Seal Line and Containers Having Same", filed in the names of Edwin Pyde and Peter Carveth, attorney docket no. BM-1344; "Container With Inner Diaphragm", filed in the name of Peter Carveth, attorney docket no. BM-1345; and "Multiple Chamber Container With Inner Diaphragm and Intermediate Chamber", filed in the names of Peter Carveth and Albert Stone, attorney docket no. BM-1347. All three applications are assigned to the assignee of the present invention.

BACKGROUND OF THE INVENTION

In the medical field it is often necessary to mix two separate components such as a mixture of a drug and a diluent or a mixture of dextrose and amino acids. Such mixtures must often be stored separately. In the case of amino acids and dextrose, for example, the mixture is not stable over long time periods. Such instability may also be the case for the mixture of a drug and a diluent. Also, some drugs lose their efficacy when stored in a liquid diluent and must be stored dry, such as a powdered drug stored in a drug vial of standard construction. Some components are sterilized differently and for this reason may be combined only after each component is separately sterilized. For example, most liquid diluents, such as sterile water or sterile dextrose solution, are sterilized by steam sterilization, or autoclaving. The heat generated during such a sterilization procedure may destroy the efficacy of many powdered drugs which must be sterilized by other means.

In addition to maintaining two components separately during storage, there is a need for a quick and easy means for selectively mixing the two components, in a closed system under sterile conditions. It is known to provide a multiple chamber container of flexible plastic sheets with a heat seal dividing the container into two or more chambers. Such is shown, for example, in U.S. Pat. No. 4,396,383 to Hart, assigned to the assignee of the present invention, directed to a container which employs frangible valves between the heat seal to allow for selective communication and mixing between the two components stored in the two chambers.

Other means for establishing a closed system for the separate storage and selective mixing of two components is shown in the copending U.S. patent application of Pearson, et al., Ser. No. 365,942 filed Apr. 6, 1982 and assigned to the assignee of the present invention. The device shown therein utilizes a preferably plastic junction about the end portions of container and chamber access means to allow for the separate storage and selective mixing of two components such as a powdered drug and a liquid diluent.

It is desirable to provide a multiple chamber closed system which does not require additional elements integrated into the container to form the openable valve between the compartments. Such are shown, for example, in U.S. Pat. Nos. 3,950,158, 4,000,996 and 4,226,330. In each of these patents there is disclosed a multiple chamber container which has a line of weakness, such as a score line in plastic material, which breaks upon the application of pressure.

Tear tabs or tear strips for plastic packaging are also known, such as shown in U.S. Pat. No. 2,991,000. Such tear tabs provided ready access to the contents of a container but also involve the use of a relatively complicated seal structure. U.S. Pat. No. 3,983,994 discloses a peelable seal broken by pulling upon tabs located outside of the container.

Rupturable seal lines such as shown in the above named patents may all suffer from the common problem of rupturing before communication between the two chambers is intended. The rupturable seal lines are designed to be weaker than the remainder of the container so that upon the application of force the rupture line breaks first.

It is also desirable to provide a multiple chamber closed container having a selectively openable seal line between the chambers which when closed virtually eliminates the transmission of moisture into one of the chambers from either outside of the container or from the other chamber. Such a requirement may be necessary when, for example, a powdered drug is stored in one of the chambers of the container.

SUMMARY OF THE INVENTION

The present invention is directed to a two chamber container for the separate storage and selective mixing of components and includes first and second sheets. The second sheet serves as a diaphragm between the first sheet and a third sheet of material opposite the first sheet. The first and third sheets are sealed about their peripheries and form the exterior wall of the container. The container further includes a unique selectively openable seal line formed between the first and the second diaphragm sheet, preferably in a chevron-type configuration. The seal line is exceptionally resistant to unintentional opening but is easy to open upon the application of a specific force. The seal line provides a seal between the first and second sheets which breaks in a predetermined manner, rupturing the second sheet so that the opening which will be formed can be anticipated in both shape and size. This container includes barrier means such as a sheet of foil with an inner adhesive layer which is secured to the exterior surface of the exterior wall of the container at that portion of the third sheet which defines the first chamber. The barrier means preferably comprises a virtually absolute barrier to gas, liquid and light.

The barrier means may be peeled away, exposing a portion of the third sheet underneath the barrier means, the third sheet having sufficient clarity to permit visual inspection of the contents of the first chamber.

The inner surfaces of the first and second sheets are thermoplastic, having substantially identical melt-flow characteristics. The inner surfaces of the two sheets are secured to each other at a seal formed by a focused energy source, such as radio-frequency energy, which melts the inner surfaces at the seal. The seal describes the seal line in cross-section.

The peelable barrier sheet may permit at least one of the three sheets of the container to be made from relatively lower cost materials such as polyvinyl chloride or ethylene vinyl acetate, instead of relatively higher cost laminate structures which would otherwise be necessary to maintain proper barriers to moisture, gas and light and for which it may be difficult to maintain sufficient clarity to visually inspect the container contents.

The peelable barrier sheet may be removed immediately before use of the container to allow for visual inspection, the barrier means permitting the use of less expensive, clear, one layer material structures.

DETAILED DESCRIPTION OF THE PREFERRED EMBODIMENTS

Figure 2:
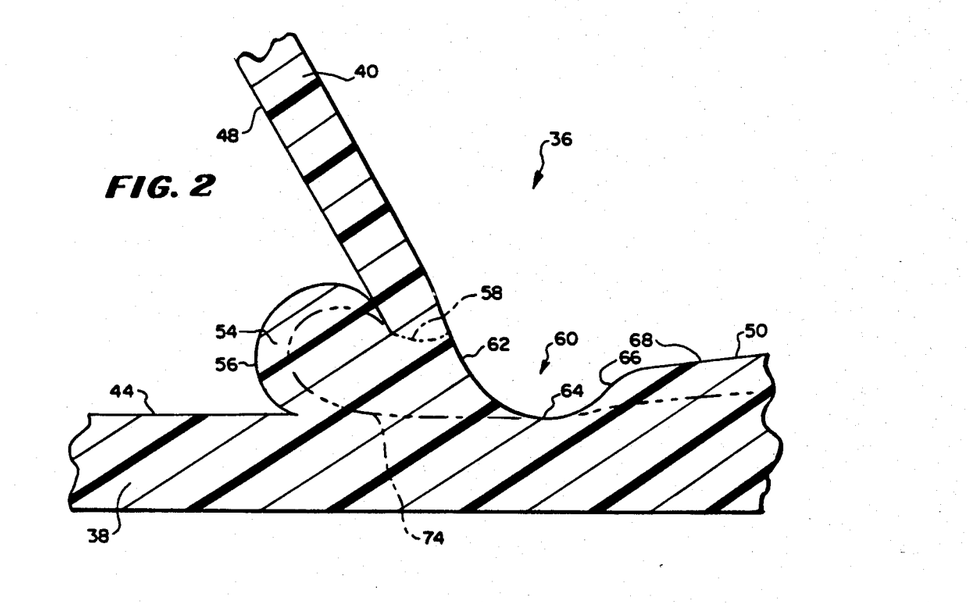
FIG. 2 is an enlarged, fragmentary cross-sectional view illustrating the seal shown in FIG. 1 and the break line and break end.
Figure 3:
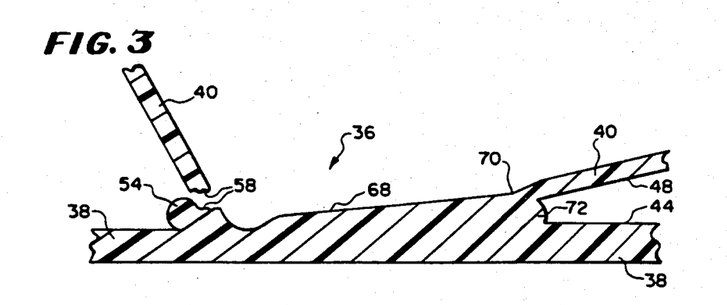
FIG. 3 is a cross-sectional view of the seal line as in FIG. 1, after the seal has been broken at the break line.
Figures 4, 5, 6:
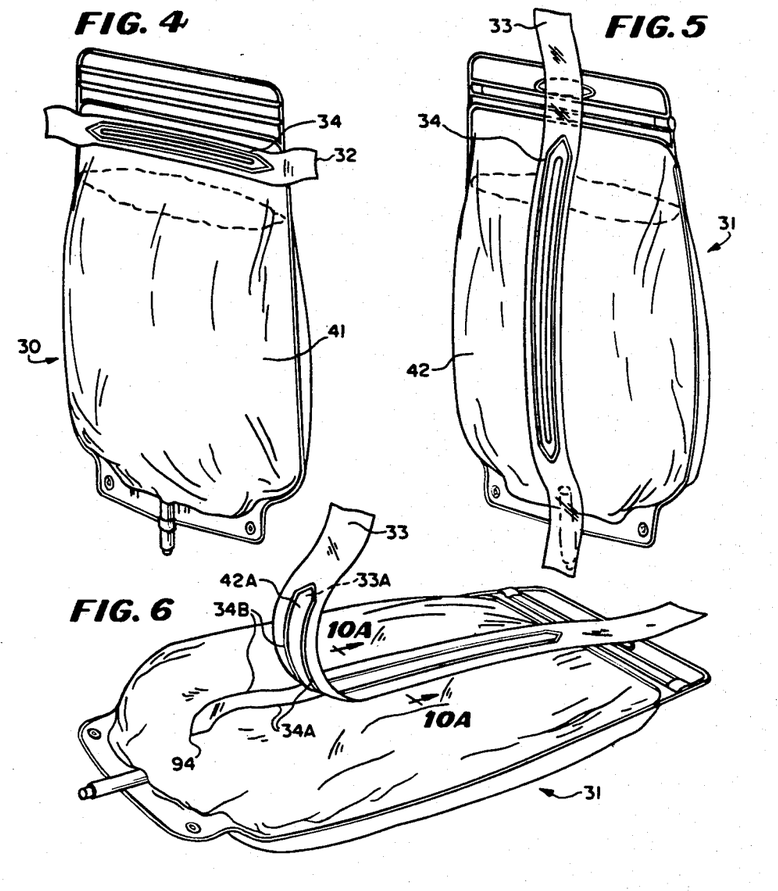
FIG. 4 is a perspective view of a container, including the openable seal line disposed between the container exterior and a pull tab.
FIG. 5 is a perspective view of a container similar to that shown in FIG. 4.
FIG. 6 is a perspective view of the container shown in FIG. 5, during opening of the seal along the seal line.

Referring to FIGS. 1 through 6 and 10A, and particularly FIGS. 4 and 5, there are illustrated containers 30 and 31 having pull taps 32 and 33, respectively, utilizing the unique selectively openable seal line 34. The seal line 34 includes seal line portion 34A and mirror image seal line portion 34B.

Figure 1:
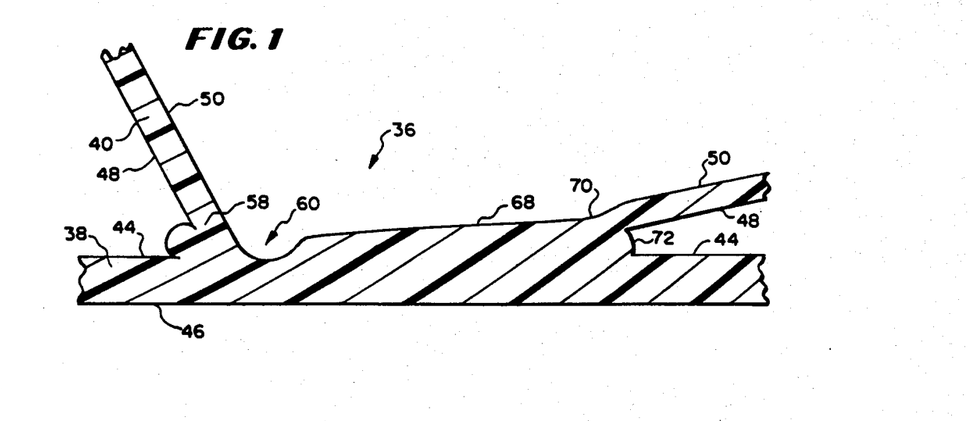
FIG. 1 is a cross-sectional view of the selectively openable seal line, illustrating the formed seal.
Figure 10A:
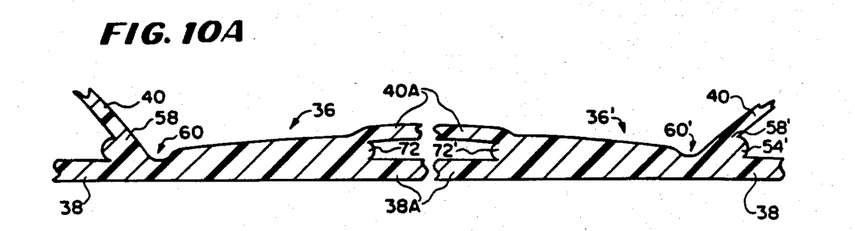
FIG. 10A is a cross-sectional view of the selectively openable seal line in FIG. 6, made with the die of FIGS. 9 and 10, taken at line 10A—10A of FIG. 6 and illustrating the seal and mirror image seal.

A cross-section of the seal line portion 34A is seen in FIGS. 1 through 3. A cross-section of the seal line 34 is seen in FIG. 10A. These Figures show the formed seal 36 between a first sheet 38 and a second sheet 40. In other words, the seal is the cross-section of the seal line.

The first sheet 38 corresponds to the pull tabs 32, 33 of the containers 30, 31, respectively. The second sheet 40 corresponds to the sidewalls 41, 42 of the containers 30, 31, respectively. The seal 36 illustrated in FIGS. 1 through 3 may also be utilized in the containers shown in FIGS. 11, 19, 20, 21, 23 and 26.

The first sheet 38 includes a first inner surface 44 of a thermoplastic material and a first outer surface 46. The second sheet 40 includes a second inner surface 48 of a thermoplastic material and a second outer surface 50. The second inner surface 48 has melt-flow characteristics substantially identical with the melt-flow characteristics of the first inner surface 44. Preferably, the first and second inner surfaces 44, 48 are made of the same material. As will be seen later, the first and second sheets may be laminated or coextruded structures including multiple layers of materials to impart different properties to the sheets.

The first and second inner surfaces 44, 48 are secured to each other at the seal 36. The seal 36 and therefore the seal line 34 are formed by a focused energy source which melts the first and second inner surfaces 44, 48 at the seal 36. Preferably, the focused energy source is radio-frequency (RF) energy applied through a unique sealing die 52, seen, for example, in FIGS. 7 and 8. The term "focused energy" is not meant to include conductive heat energy but may include ultrasonic energy. The seal 36 is also preferably made by applied pressure as well as by the focused energy.

The unique seal 36 formed between the sheets 38, 40 at the inner surfaces 44, 48, respectively is illustrated in FIGS. 1 through 3, showing the formed seal 36 along a cross-section taken through the seal line 34, at portion 34A, perpendicular to the seal line 34. Referring to FIG. 2, this seal 36 includes a bead area of increased thickness 54 at a break end 56 of the seal 36, between the first and second inner surfaces 44, 48, respectively. The bead area of increased thickness 54 is coextensive with the first and second inner surfaces 44, 48 along less than all of the surface of the bead area. Thus, in FIGS. 1 through 3 there is shown a space between the first and second sheets 38, 40 to the left of the break end 56.

Unlike what might be expected, the seal 36 breaks at a break line 58 which is disposed inwardly of the break end 56 and between the second sheet 40 and the bead area of increased thickness 54. The break line 58 defines the boundary between the second sheet 40 and the bead area 54. The width of this boundary area defined by the break line 58 is at the least not substantially less than the thickness of the second sheet 40. In fact, the width of the boundary area may be equal to or greater than the thickness of the second sheet 40.

The seal 36 further includes an arcuate depression 60 including a concave downward surface 62 extending from substantially adjacent the break line 58 to a minimum seal thickness point 64. It is important to note that the seal does not break at the minimum seal thickness point 64. The distance between the minimum seal thickness point 64 and the first outer surface 46 is preferably not less than the thickness of the first sheet 38 and at the most not substantially greater than the thickness of the first sheet.

The arcuate depression 60 preferably also includes a concave upward surface 66 extending upwardly from the minimum seal thickness point 64, away from the concave downward surface 62.

The seal 36 also preferably includes a beveled surface 68 defined by the second outer surface 50, beyond the concave upward surface 66. The beveled surface 68 preferably begins adjacent the concave upward surface 66. The thickness of the seal 36 increases along the beveled surface 68 from the concave upward surface 66 to a bevel end 70 of the seal 36.

The bevel end 70 may be defined in part by a secondary bead area 72 of excess material. The second sheet 40 extends away from the seal 36 intermediate the beveled surface 68 and the secondary bead area 72.

The thickness of the second sheet 40 is at the most not substantially greater than the thickness of the first sheet 38. Preferably, the thickness of the second sheet 40 is less than the thickness of the first sheet and, most preferably, at least about 0.003 in. less than the thickness of the first sheet 38. For illustration purposes only and not as a limitation, the first sheet may have a thickness of 0.015 in. and the second sheet may have a thickness of 0.010 in.

By way of example only, and not intended as limiting the invention, the following are other sample measurements for the seal 36. The width of the arcuate depression may be about 0.02 in. The bevel may extend away from the arcuate depression 60 at an angle of approximately 5° from horizontal. The width of the seal from the beginning of the arcuate depression 60 to the bevel end 70 may be about ⅛ in.

As stated earlier, the first and second inner surfaces 44, 48 are preferably of the same material. It is believed that polyvinyl chloride, ethlyene vinyl acetate (EVA) and SARAN ™ are all materials which work well in making the seal 36. The entire sheets may be made of these materials or just the inner surfaces.

While the mixing of the material from the first and second sheets 38, 40 at the seal 36 is not known, it is believed to approximate the phantom boundary line 74 seen in FIG. 2. In one test, the first sheet 38 was dyed a distinctly different color than the second sheet 40. The seal 36 was then made, resulting in a boundary such as shown at line 74. Thus, it is believed that the bead area of increased thickness 54 comprises material from both of the first and second sheets 38, 40. However, it is also believed, but not known, that the break line 58 comprises material only from the second sheet 40. Thus, the phantom break line 58 illustrated in FIG. 2 is not intended to be a part of phantom boundary line 74.

Referring now to FIGS. 7-10 there are illustrated sealing dies for making the seal lines such as the seal line 34 shown in the containers 30, 31 illustrated in FIGS. 4-6, as well as the method for making the seal line. The sealing die 52 includes a metal die head 76 and an unheated or cold plate 78 opposite the die head 76. The first and second sheets 38, 40 are mounted between the die head 76 and the plate 78 during formation of the seal line 34.

Figure 7:
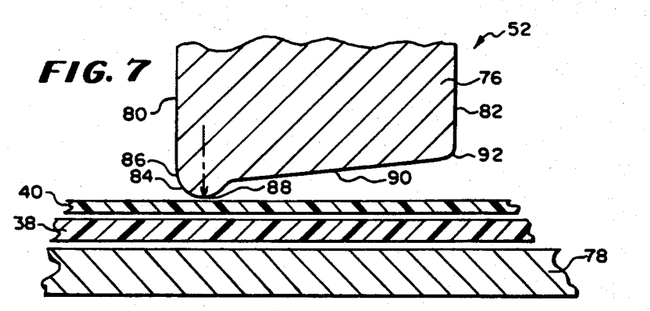
FIG. 7 is a cross-sectional schematic view illustrating the sealing die before forming the selectively openable seal line.
Figure 8:
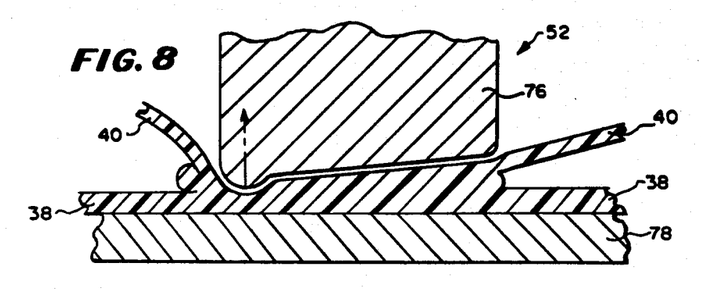
FIG. 8 is a cross-sectional view illustrating the formed seal and sealing die.

FIGS. 7 and 8 illustrate the metal die head in cross-section. The metal die head 76 has first and second die sides 80, 82, respectively. Immediately adjacent the first die side 80 is a convex rounded projection 84. The convex rounded projection 84 merges at one side thereof into the first die side 80 at a first die side end 86. The convex rounded projection 84 further includes a point of maximum projection 88. A bevel 90 extends from the rounded projection 84 to the second die side 82 at a second die side end 92. The bevel 90 recedes from the point of maximum projection 88 in the vertical direction. For purposes of this application, the words "horizontal" and "vertical" are made with reference to the drawings only. It should be understood that, for example, the seal line 34 may be formed with the sheets 38, 40, metal die head 76 and unheated plate 78 oriented ninety degrees or any angle from that shown in FIGS. 7 and 8.

The vertical distance between the point of maximum projection 88 on the rounded projection 84 and the second die side end 92 is preferably greater than the vertical distance between the point of maximum projection 88 and the first die side end 86. It is believed that the vertical distance between the first die side end 86 and the point of maximum projection 88 should not be greater than the thickness of the second sheet 40. The bevel 90 extends away from the rounded projection 84 at approximately 5° from horizontal. The vertical distance between the first die side end 86 and the point of maximum projection 88 may be in the range from about 0.007 to about 0.008 in. for example. The rounded projection 84 may have a width of about 0.020 in. The width of the sealing die between the first and second die sides 80, 82 may be about ⅛ in. These sample measurements of the sealing die would be appropriate when utilizing first and second sheets 38, 40 having thicknesses of about 0.015 and 0.010 in., respectively.

As stated above, the seal 36 and resulting seal line 34 are formed by mounting the first and second sheets 38, 40 between the metal die head 76 and unheated plate 78. Focused energy is applied through the die head 76 and is preferably radiio-frequency (RF) energy. The die head 76 is lowered into contact with the second sheet 40. Pressure may be applied simultaneously with the focused energy. After the seal 36 is formed, the metal die head 76 is lifted away, such as shown in FIG. 8.

Figures 9, 10:
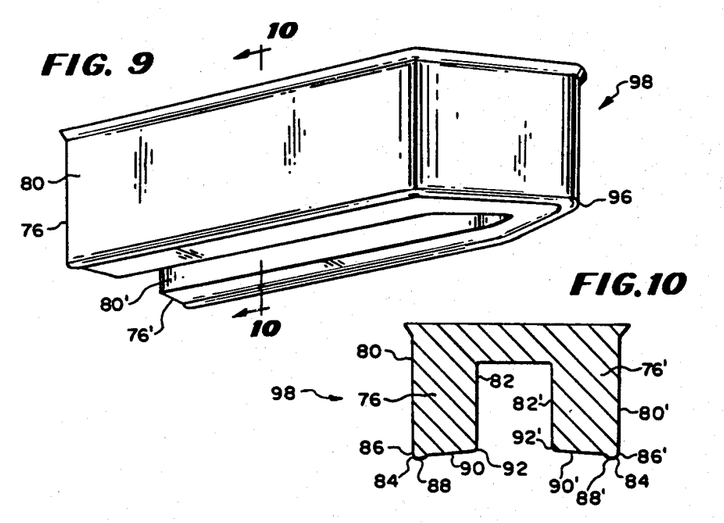
FIG. 9 is a perspective view of a sealing die.
FIG. 10 is a cross-sectional view taken at line 10—10 of FIG. 9.

The specific seal lines shown in the containers of FIGS. 4-6 include, in addition to the seal 36, a mirror image seal 36' substantially identical to the seal 36. The mirror image seal 36' is a cross-section of the seal line portion 34B. FIGS. 9 and 10 illustrate the die 98 for such a seal line 34. Referring back to FIG. 6, the seal line begins at a seal line opening end 94. The seal 36 and the mirror image seal 36' commence from the common seal line opening end 94 which corresponds to the sealing die end 96 of the sealing die 98 illustrated in FIGS. 9 and 10. The portions 34A, 34B of the seal line 34 initially extend away from each other from the seal line opening end 94 at an angle less than 180°.

The seal line 34 utilized in the container of FIGS. 4-6 is best illustrated in FIG. 10A, showing both the seal 36 and the mirror image seal 36'. The cross-section of the combined seal 36 and mirror image seal 36' illustrated in FIG. 10A is the preferred embodiment for the seal line 34 used with the tear tab arrangement of the containers shown in FIGS. 4-6. Here, the seal break line 58 and the mirror image break line 58' are separated by the seal arcuate depression 60 and the mirror image seal arcuate depression 60'. This arrangement corresponds with the sealing die 98 illustrated in FIGS. 9 and 10.

It is possible that the seal and mirror image seal could be reversed such that the seal arcuate depression and the mirror image seal arcuate depression are separated by the seal break line and the mirror image break line. In such a construction, the break lines would thus be in the inner, facing portions of the seal line as opposed to the outer, opposite portions of the seal line illustrated in FIG. 10A. Preferably, the seal line portions 34A, 34B, corresponding to the seal 36 and mirror image seal 36', respectively, initially extend away from each other at an angle not greater than about 90°. The portion 38A shown in FIG. 10A corresponds to the inner area 33A of the pull tab 33 shown in FIG. 6. The portion 40A corresponds to the inner area 42A of the container sidewall 42 which is removed with the tab 33. The inner area 42A is secured to the tab 33 along the seal line 34.

As seen in FIG. 6, the seal line portions 34A, 34B, after initially extending away from each other from the seal line opening end 94, extend in substantially parallel relation at a distance between break lines 58, 58' of not greater than about one-half inch, in the preferred embodiment.

The sealing die 98 illustrated in FIGS. 9 and 10 for producing the combined seal 36, 36' illustrated in FIG. 10A includes both a metal die head 76 and a mirror image metal die head 76', each including, respectively, first die sides 80, 80' and second die sides 82, 82'. The die head 76 may be the same as the die head 76 shown in FIGS. 7 and 8 as part of the sealing die 52. While a seal and seal line can be made from the sealing die 52, the sealing die 98 is utilized with the seal lines 34 shown in the containers 30, 31.

Each die head 76, 76' includes a convex rounded projection 84, 84' merging at one side thereof into its respective first die side 80, 80' at a respective first die side end 86, 86'. Each convex rounded projection 84, 84' has a corresponding point of maximum projection, 88, 88'. A bevel 90, 90' extends from each of its respective rounded projections 84, 84' to its respective second die side 82, 82' at a respective second die side end 92, 92'. As discussed relative to FIGS. 7 and 8, each of the bevels 90, 90' recedes from the respective point of maximum projection 88, 88' in the vertical direction. The die head 76 and mirror image die head 76' correspond to the seal line portion 34A and the mirror image seal line portion 34B of the seal line. The die head 76 and mirror image die head 76' converge at a sealing die end 96 corresponding to the seal line opening end 94.

Vertical distance between each point of maximum projection 88, 88' and its respective second die side end 92, 92' is greater than the vertical distance between each point of maximum projection 88, 88' and the respective first die side end 86, 86'.

It should be noted that although the seal line 34 is made by the sealing die 98 in the preferred construction for the tear tab arrangement on the containers shown in FIGS. 4-6, it is quite possible to construct the tear tab arrangement utilizing only the seal line 34A comprising the seal 36 without the mirror image seal 36'. The construction of such a seal line would be made with the sealing die 52 shown in FIGS. 7 and 8 without the mirror image metal die head 76'. The resulting seal line could be a straight line. Whereas the seal line 34, shown for example in FIG. 6, creates an open area when opened, a single seal line portion 34A would create a tear line in the bag material when opened, as opposed to an open area. Also, it is believed that the single seal line portion 34A may be more susceptible to inadvertent opening than is the seal line 34 having both seal 36 and mirror image seal 36'.

The container 30, 31 described above may be used for storage where quick access is necessary. For example, the containers may be used to store "slush", a partially frozen medical solution used during surgery. The container may have an outer wrap which is removed outside the operating circle. The tear tab may be broken by a sterile operator within the operating circle.

Referring now to FIGS. 11-14, there is shown a unique multiple-chamber container 100. The container 100 includes a first sheet 102, a second, diaphragm sheet 104 and a third sheet 106. The first sheet 102 and the second sheet 104 correspond to the sheets 38 and 40 respectively in the discussion relative to FIGS. 1-3.

Figures 11, 12, 13, 14:
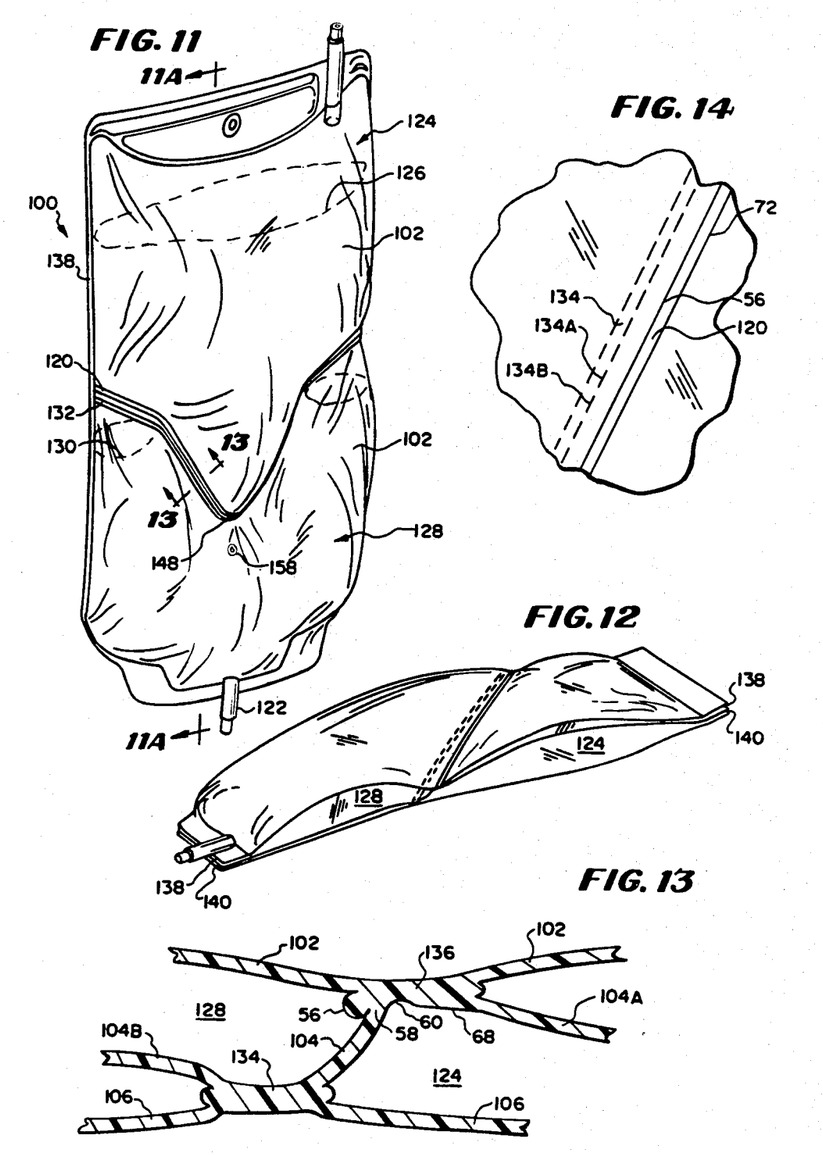
FIG. 11 is a perspective view of a container having an inner diaphragm sheet and the selectively openable seal line.
FIG. 12 is a perspective, cutaway view of the container of FIG. 11.
FIG. 13 is a cross-sectional view of the openable seal line and permanent line of securement taken at line 13—13 of FIG. 11, illustrating the formed seal.
FIG. 14 is an enlarged, fragmentary side elevational view of a portion of the seal line of the container shown in FIG. 11.

The first sheet 102 includes a first inner surface 108 and a first outer surface 110. The second, diaphragm sheet 104 includes a second inner surface 112 and a second outer surface 114. The third sheet 106 includes a third inner surface 116 and a third outer surface 118.

Figure 11A:
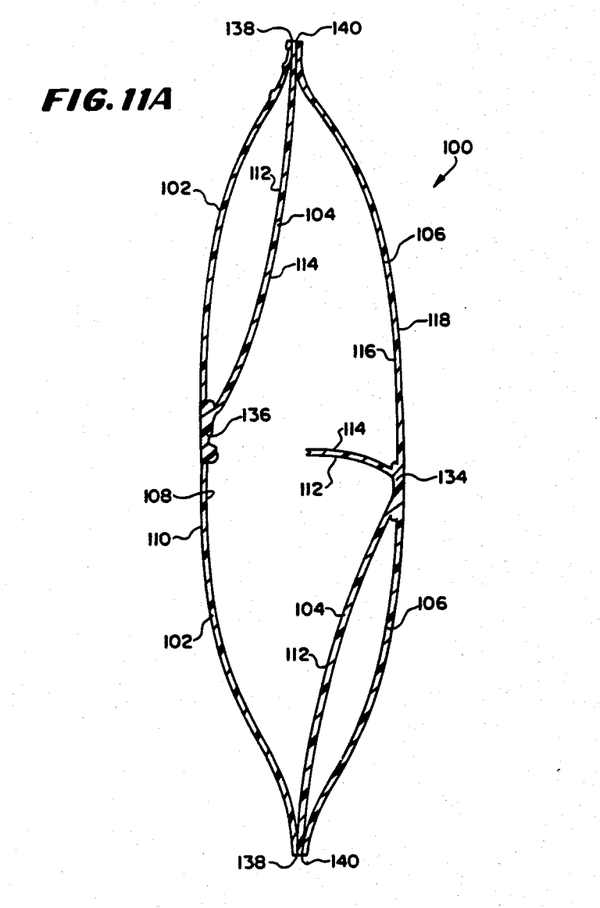
FIG. 11A is a cross-sectional view taken along the length of the container as shown at line 11A—11A of FIG. 11, but after the seal line has been broken.
Figure 19:
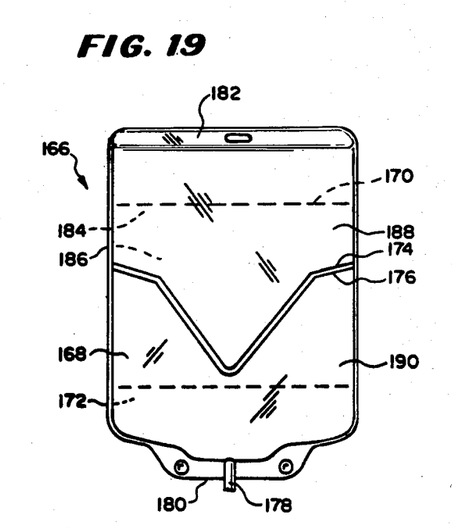
FIG. 19 is a side elevational view of an alternate structure to the container of FIG. 11.

The first, second and third sheets 102, 104, 106 are sealed together about their peripheries. The second diaphragm sheet 104 is sealed about at least a portion of its periphery such as shown in FIG. 19, discussed below, but in the preferred embodiment is sealed about its entire periphery, intermediate the first and third sheets 102, 106, as seen in FIGS. 11 and 11A. The first and third sheets 102, 106 form the exterior wall of the container 100.

The sheets 102, 104, 106 are preferably flexible and it is preferred that each sheet is made at least partially of a thermoplastic. The peripheries of the first, second and third sheets 102, 104, 106 may be sealed with a standard heat seal.

An externally, manually breakable line of securement 120 is made between the first sheet 102 and the second, diaphragm sheet 104. The breakable line of securement 120 may be the selectively openable seal line having the seal 36 discussed above, in order to provide an extremely secure seal which is not easily opened unintentionally but which may be selectively opened when desired. Also, the selectively openable seal line, such as discussed with reference to FIGS. 1-10, for example, opens in a predetermined manner without creation of loose material which could contaminate the container contents. However, the breakable line of securement 120 may be of some alternate construction. In order to provide quick communication and mixing between the components in the two chambers of the container 100, the breakable line of securement 120 extends across the entire width of the container, although this is not necessary to the operation of the container. The breakable line of securement 120 has a substantially chevron shape.

Port means such as a tubular port assembly 122 may be mounted in the container 100 to communicate with the interior of the container 100. The tubular port assembly 122 may include a sealing membrane (not shown) capable of being pierced by, for example, the cannula or spike of a parenteral administration set for delivery of the container contents through the administration set to the intravenous system of a patient.

The second, diaphragm sheet 104, the breakable line of securement 120 and the third sheet 106 together define a first chamber 124 for holding the first component 126 to be stored. The first sheet 102, the breakable line of securement 120 and the second, diaphragm sheet 104 together define a second chamber 128 for holding the second component 130 to be stored.

Although not necessary, it is highly preferred that the container 100 also include a permanent line of securement 132 between the second, diaphragm sheet 104 and the third sheet 106. The permanent line of securement 132 extends substantially parallel to and substantially the length of, the breakable line of securement 120. With the inclusion of the permanent line of securement 132 the first chamber 124 and second chamber 128 are further defined by the permanent line of securement 132. The permanent line of securement 132 may be a standard heat seal, for example, such as shown by the seal 134 in FIG. 13. The seal 134 refers to the cross-sectional configuration of the permanent line of securement 132. A cross-sectional view of the breakable line of securement 120 is the breakable seal 136 which is illustrated, for example, in FIGS. 11A and 13 as the seal 36 of the seal line 34. One again, however, it should be noted that the breakable line of securement 120 may include seal lines other than the unique seal line 34.

FIG. 12 is an enlarged fragmentary view of the seal structure of the container 100. The two phantom lines correspond to the two ends 134A, 134B of the heat seal 134. The solid line closest to the phantom line represents the break end 56 of the seal 136. The other solid line represents the secondary bead area 72.

As illustrated in FIG. 11, it may be desirable to extend the breakable line of securement 120 entirely across the container, spanning the peripheral seal 138 of the first and second sheets 102, 104. This creates a first chamber portion 104A of the second, diaphragm sheet 104. Thus, the second chamber 128 is exclusive of a boundary with the first chamber 124 at the first chamber portion 104A of the second diaphragm sheet.

Similarly, it would then be desirable to extend the permanent line of securement 132 entirely across the container 100, spanning the peripheral seal 140 of the second and third sheets 104, 106, thereby creating a second chamber portion 104B of the second sheet bounded in part by the permanent line of securement 132. Thus, the first chamber 124 is then exclusive of any boundary with the second chamber 128 at the second chamber portion 104B of the second sheet. When, as is preferred, the breakable and permanent lines of securement 120, 132 both extend entirely across the container, a common portion 104C of the second sheet is thereby created. With this configuration, the first and second chambers 124, 128 share a boundary only at the common portion 104C of the second sheet 104.

Such a configuration has at least two distinct advantages. First, the two components 126, 130 do not overlap. Thus, if it is desirable to inspect the container contents before mixing and the container wall is transparent or translucent, it is possible to inspect each component separately without also viewing the other component. Secondly, and more importantly, such a structure drastically limits the common border of the two chambers 124, 128. This is important for limiting the transmission of moisture or gas into one of the chambers from the other through the material of the second sheet 104. The area is thus limited to the breakable and permanent lines of securement 120, 132 and the common portion 104C of the second sheet 104.

In this regard, the container may be made from a variety of different plastic materials. These include, without limitation, polyvinyl chloride, ethylene vinyl acetate (EVA) and SARAN®. What appears to be important when making the selectively openable seal line 34, which may be used as the breakable line of securement 120, is that the first inner surface 108 of the first sheet 102 and the second inner surface 112 of the second sheet 104 be thermoplastic materials having similar or identical melt-flow characteristics, in order to enable manufacture of the unique seal 36, 136.

Further, in medical applications such as when amino acids and dextrose are stored in the two chambers, it is important to limit oxygen transmission through the container wall into the chambers as well as limit moisture transmission through the container walls and across the diaphragm sheet 104. An even more critical example includes use of the container 100 to store, for example, dextrose or saline solution in the first chamber 124 and a powdered drug in the second chamber 128. In this application it is imperative that virtually no moisture be transmitted into the second chamber 128 containing the dry drug. In order to limit the transmission of moisture from the solution in the first chamber across the common portion 104C into the second chamber, it is desirable to utilize various laminate structures in making the container and especially in making the second diaphragm sheet 104. Two examples of exceptional moisture and gas transmission barrier materials are SARAN and aluminum foil. The second sheet 104 may be manufactured with a layer of, for example, SARAN or foil or other high barrier property material, allowing the inner surface 112 of the diaphragm sheet 104 to be maintained as a thermoplastic material similar to the material of the inner surface 108, in order to permit a proper seal between the first and second sheets 102, 104.

However, it must be remembered that the first and third sheets 102, 106, as well as the second sheet 104, may also be laminate structures comprising at least two or more layers of material. This is especially important in the medical field, such as when amino acid solution and dextrose solution may be stored in the two chambers 124, 128. Here, it is desirable to prevent the transmission of air into the container through the wall and to prevent the loss of liquid out of the container.

The use of laminate structures becomes even more critical when a dextrose or saline solution, for example, is stored in the first chamber 124 and a powdered dry drug is stored in the second chamber 128. Here, it is critical that virtually no moisture reaches the dry powdered drug. The saline solution stored in the adjacent chamber is limited to transmission through the common portion 104C of the diaphragm sheet 104. If a high vapor and moisture barrier such as SARAN or metal foil is used in all three sheets, virtually no moisture from the liquid in the first chamber or from outside the container should reach the dry powdered drug in the second chamber.

It may be seen that the container 100 provides an excellent means for the separate storage of two components. A nurse or other operator may selectively mix the two components by simply grasping the first and third sheets (i.e., the outside wall of the container) and manually separating the two sheets, pulling them in opposite directions, near the breakable line of securement. This action will rupture the breakable line of securement 120 and therefore the second sheet 104 as well, placing the first and second chambers 124, 128 in open communication, as best seen in FIG. 11A. The advantages of utilizing the selectively openable seal line 34 as the breakable line of securement 120 in the container 100 are now readily apparent. The seal line 34 is not believed susceptible to opening upon the application of unintended forces such as may be commonly found during shipment, storage and handling of the container both to and in a hospital. The selectively openable seal line 34 may, however be easily opened by the manual separation of the first and third sheets near the seal line. The seal line 34 breaks in a predetermined manner.

It is also believed that the unique container structure utilizing the permanent line of securement 132 closely parallel to or opposite the breakable line of securement 120 greatly facilitates the easy selective breaking of the second sheet, because the common portion 104C is stretched between the permanent seal 134 and the breakable seal 136. The breakable seal 136 ruptures, placing the two chambers in communication. When the permanent line of securement 132 is not included, the opening action by the operator is the same except that the first and second, instead of first and third sheets are grasped. The second sheet is grasped from the container-exterior, so that the second and third sheets are folded between the thumb and index finger of one hand.

Figures 15, 16, 17, 18:
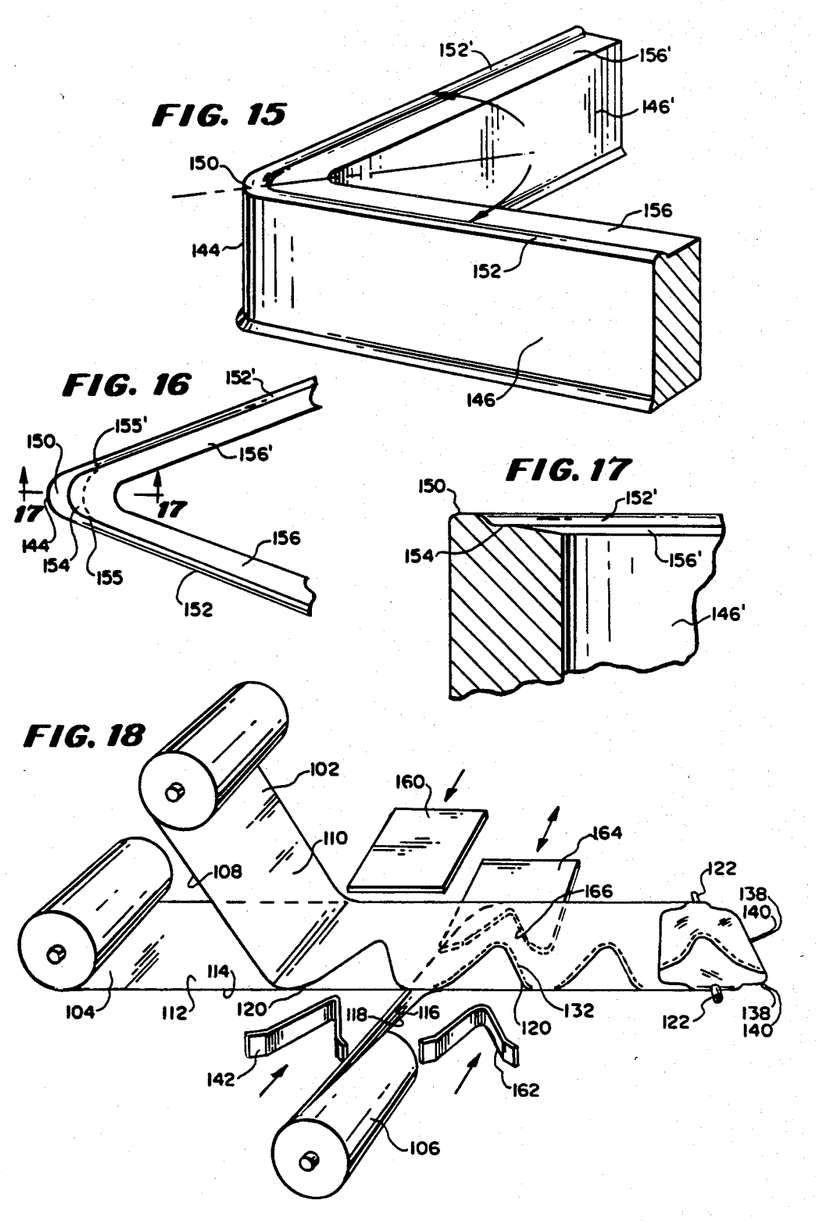
FIG. 15 is a cutaway perspective view of a sealing die utilized in making the openable seal line of the container of FIG. 11.
FIG. 16 is a top plan view of the sealing die shown in FIG. 15.
FIG. 17 is a cross-sectional view taken along line 17—17 of FIG. 16.
FIG. 18 is a schematic view illustrating the manufacturing process for the container.

When the selectively openable seal line 34 is utilized as the breakable line of securement 120 in the container 100, the seal line 34 may be manufactured utilizing the sealing die 142 illustrated in FIGS. 15–17. The sealing die 142 is similar to the sealing die 98 except that, instead of changing from initially a chevron shape to two parallel lines, such as portions 34A, 34B, the general chevron shape is used for the entire sealing die and thus the entire line of securement 120. The chevron shape preferably at least begins at an angle of less than 90° and may widen to an angle of less than 180°. The sealing die 142 illustrated in FIGS. 15–17 includes a sealing die end 144 shown in greater detail than the sealing die end 96 of the sealing die 98 but which may also be used in the sealing die 98. The sealing die end 144 is the point at which the die head 146 and mirror image die head 146' converge and corresponds to the seal line opening end 148 of the breakable line of securement 120 when the openable seal line 34 is employed. The die head and mirror image die head 146, 146' include, about the sealing die end 144, an end convex rounded projection 150 which is substantially wider than and which narrows into the convex rounded projections 152, 152' of the die heads 146, 146'. Further included is a flat 154, intermediate the end convex rounded projection 150 and the bevel 156, 156', the flat 154 narrowing to a point 155, 155' in both the die head 146 and mirror image die head 146' whereat the bevel 156, 156' begins adjacent the rounded projection 152, 152'. The width of the bevel 156, 156' remains constant throughout the entire length of the sealing die, including the sealing die end 144.

When the selectively openable seal line 34, 120 is made utilizing the sealing die 142, a seal line opening end 148 results which includes an opening arcuate depression which is substantially wider than and which narrows into the seal arcuate depression 60 and mirror image arcuate depression 60'. As an example, the width of the opening arcuate depression at the opening end 148 may be about 0.04 in. and may narrow to about 0.02 in. at the arcuate depression 60 and mirror arcuate depression 60' seal. The seal line 34, 120 will thus also have an opening end seal 148 having a corresponding seal flat surface intermediate the concave upward surface 66 and the beveled surface 68. The flat surface will narrow to a point into the seal line portion 34A and mirror image seal line portion 34B of the seal line 34, 120 whereat the beveled surface 68 of the seal 136 begins adjacent the concave upward surface. It follows that the width of the beveled surface 68 of the seal line 34, 120 shall remain constant through the entire length of the seal line when the sealing die 142 is employed. The seal line opening end 148 corresponds to the tip of the chevron shape.

As a simple test to assure that the breakable line of securement 120 has not been even partially opened, a tack seal 158 may be provided between the first and second sheets 102, 104 and spaced from the seal line opening end 148, the seal line opening end 148 most probably being the weakest point in the breakable line 34, 120. The tack seal 158 will break before the breakable line 120 opens. The tack seal, which may be a small-area, weak heat seal, makes a small but audible noise when broken. Thus, if the noise is heard when breaking the line of securement 120, one knows that the seal line opening end 148 has not been disturbed.

Referring now to FIG. 18, there is illustrated a schematic view of the manufacturing procedure for the container 100.

A continuous supply of the first, second and third sheets 102, 104, 106 is provided, typically in the form of roll stock. The sheets are aligned such that the first and third sheets 102, 106 are substantially coextensive, with the second sheet intermediate the first and third sheets. For purposes of illustration only, the first and third sheets may be ethylene vinyl acetate having a thickness of 0.015 in. The second sheet 104 may have inner and outer surfaces of ethlyene vinyl acetate and an inner layer of SARAN or foil, the second sheet 104 having a thickness of about 0.010 in.

The breakable line of securement 120 is then formed. If the container to be formed employs the openable seal line 34 as the breakable line of securement 120, a sealing die such as the sealing die 142 is brought into contact with the second, diaphragm sheet 104 on the opposite side of the first sheet 102. An unheated or cold flat plate 160 preferably of metal is disposed against the first sheet 102 opposite from the second sheet 104. The focused energy is then applied through the sealing die 142.

If the breakable line of securement 120 does not employ the openable seal line 34, but instead utilizes a weakened seal line such as may be made by forming a line of thinner material, the unique sealing die 142 may be replaced with the appropriate known die to produce such a weakened seal line.

In the preferred embodiment using the openable seal line 34, the seal line 34 is formed utilizing a Thermatron RF Sealing Machine, Model No. KF62/SP40, sold by Solidyne, Inc. of Bay Shore, N.Y. The sealing machine is listed at 6,000 watts and the RF energy is applied at 27 Megahertz, within six percent.

The sealing die 142 is in contact with the second sheet 104 typically for a period of as much as five or six seconds, although the contact time may be as little as about three seconds and may be still further reduced. The RF energy is preferably applied somewhere in the middle of the contact time period and may be applied for about one second or longer.

The openable seal line 34, illustrated by the seals 36, 136 in cross-section, is formed with the application of relatively little pressure. For example, a peripheral heat seal 138, 140 sealing the peripheries of the sheets may involve the use of as much as 500 psi. The openable seal line 34 utilizes pressure of probably less than 25 psi. The sealing machine may be set to include a stop on the die approximately 0.004 in. into the second sheet 104. It may indeed be possible to make the seal 36, 136 without the application of any pressure whatsoever. It is preferred that the unheated or cold plate 160 is maintained at a relatively cold temperature by, for example, water cooling the plate 160. The cold plate serves to prevent or drastically reduce any indentation of the outer surface 110 of the first sheet 102, i.e., it reduces the effect of the RF energy at the outer surface 110. After the seal line is formed, the sealing die 142 and cold plate 160 are disengaged and the three sheets, the first and second sheets now being attached, travel to the next station, where the permanent line of securement 132 is formed. The permanent line of securement may be formed with a standard flat sealing die 162 shaped to create a permanent line of securement 132 which runs parallel to the breakable line of securement 120. The permanent line of securement 132 may be made upon the application of heat and pressure and may utilize RF energy. The standard sealing die 162 may be urged against the third outer surface 118. A glass buffer 164 may be inserted between the first and second sheets 102, 104. The glass buffer 164 preferably has a cut-out end 166 corresponding with the breakable line of securement 120, so that the buffer 164 may be brought fairly close, if not adjacent to, the breakable line of securement 120. An additional glass buffer (not shown) may also be employed adjacent the first outer surface 110 of the first sheet 102.

The sheets are then translated to another station to permanently seal the first and third sheets about their peripheries and to seal at least a portion of the periphery of the second sheet. Typically, and as shown in FIG. 18, the second sheet 104 is provided from roll stock of the same thickness as the first and third sheets 102, 104. However, as shown later in FIG. 19, the second sheet may be narrower, thus not extending the entire length of the finished container. However, taking the most typical case utilizing the full width second sheet, the peripheral seals 138, 140 between the first and second sheets and the second and third sheets, respectively, are formed. These seals may be made in a typical known manner utilizing heat and pressure, the pressure perhaps approaching 500 psi, as stated earlier. Typically, the container is cut away from the supply material along the outer boarders of the peripheral seals 138, 140. This may be performed during the same step as forming the peripheral seals.

In the preferred embodiment, the peripheries of the sheets are sealed except for openings into the first and second chambers. These openings are used to both fill the first and second chambers 124, 128 with the components 126, 130. Also, port means such as a tubular port assembly 122 may be inserted through the openings about which standard heat seals may be made to close both the chambers and form the finished product.

The finished container 100 is thus formed which, depending upon he respective materials and laminate structures of the first, second and third sheets, provides sterility, moisture and vapor barriers both between the first and second chambers and between the container and the environment. These qualities are all crucial when employing medical substances in the two chambers. The container is thus capable of maintaining the components 126, 130 in sterile condition.

Referring once more to FIG. 19, there is shown an alternate embodiment of the container 166. The container 166 may be substantially identical to the container 100, utilizing first and third sheets 168 and 172 and including a breakable line of securement 174 and a permanent line of securement 176. A tubular port assembly 178 may also be provided. Here, however, the second, diaphragm sheet 170 does not extend the full length of the container 166 from the administration port end 180 to the hanger end 182. Instead, the roll stock for the second sheet and thus the second sheet itself is wide enough to provide breakable and permanent lines of securement 174, 176 which may be identical to the breakable and permanent lines of securement 120, 132.

Such a configuration is not as desirable as the container 100 previously described because the components stored in the container may be disposed on both the inner and outer surfaces 184, 186 of the second sheet of both the first and second chambers 188, 190. This is true both before and after separation of the breakable line 174 and mixing of the components.

Figure 21:
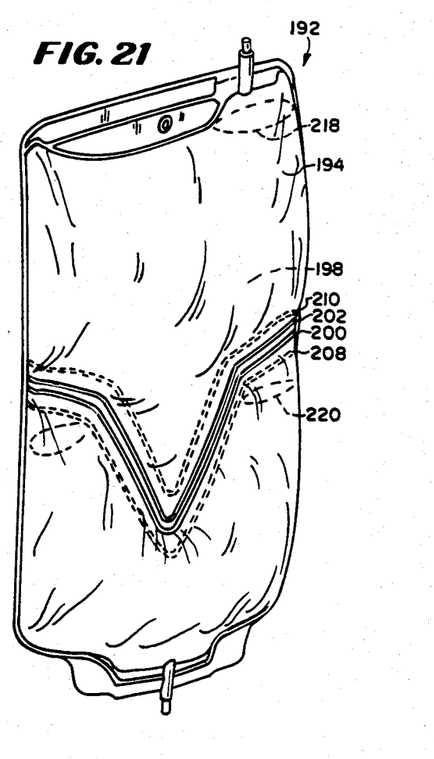
FIG. 21 is a perspective view of a still further modified container.
Figure 22:
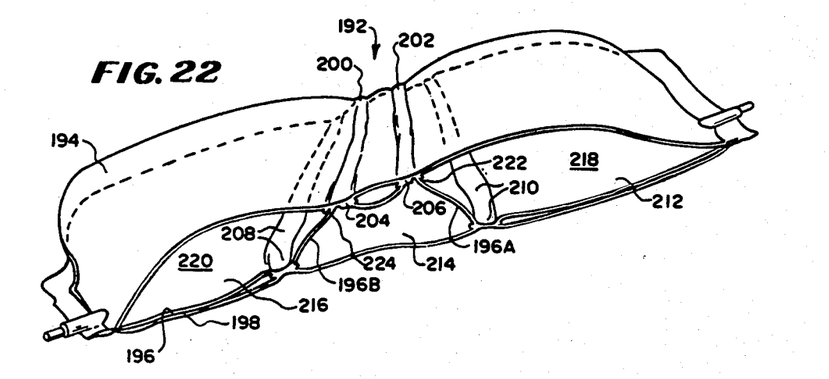
FIG. 22 is a cutaway view of the container illustrated in FIG. 21.
Figure 23:
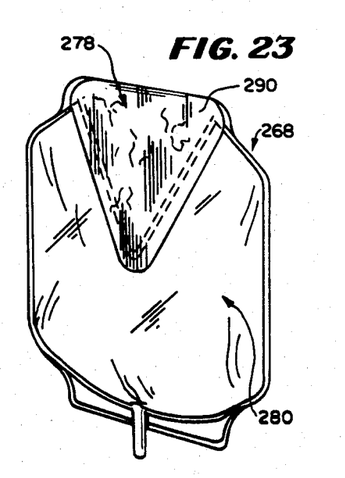
FIG. 23 is a perspective view of a container utilizing peelable barrier means.

Referring now to FIGS. 21 and 22, there is illustrated a further alternate container 192. The container 192 may be identical to the container 100 except that there are a plurality of both breakable and permanent lines of securement.

The container 192 includes first, second and third sheets 194, 196 and 198. Although the breakable lines of securement 200, 202 may include various types of selectively breakable lines, the breakable lines of securement 200, 202 are illustrated in FIGS. 21 and 22 and will be described hereafter as embodying the unique seal line such as designated above as seal line 34, having cross-sectional seals 204, 206, respectively, which are the same as both previously designated seals 36 and 136. A plurality of permanent lines of securement 208, 210 are provided which are substantially coextensive with and parallel to the respective breakable lines of securement 200, 202.

The container 192 includes a first chamber 212, a second chamber 214 and a third chamber 216. Here, the third chamber 216 is defined in part by the first and second sheets 194, 196 as is the first chamber 212. The second chamber 214 is defined in part by the second and third sheets 196, 198.

The first chamber 212 is defined by the second, diaphragm sheet 196, the openable seal line 202, the first sheet 194 and the permanent line of securement 210. The third chamber 216 is defined by the second sheet 196, the openable seal line 200, the first sheet 194 and the permanent seal line 208.

The second chamber 214 is defined by the second sheet 196, the third sheet 198, both openable seal lines 200, 202 and both permanent seal lines 208, 210.

As shown in FIGS. 21 and 22, the second chamber 214 serves as a buffer. Although there is room for storage, it is not intended that any component be stored in the second chamber 214. The container 192 includes first and second common portions 196A, 196B of the second sheet 196. The container 192 thus segregates components 218, 220 which may be stored in the first and third chambers 212, 216 to an even greater extent that the segregation of the two components in the container 100.

Mixing of the components 218, 220 is affected in the same manner as with the container 100. The first and third sheets 194, 198 are pulled apart near the lines of securement 200, 202, 208, 210, thus rupturing the second sheet 196 at the break lines 222 and 224. Upon rupture of the second sheet 196 at the break lines 222, 224, the first, second and third chambers are placed in open communication. With the breakable lines of securement 200, 202 spanning virtually the entire width of the container 192, a homogenous mixture of the components 218, 220 may be obtained almost immediately.

Figure 20:
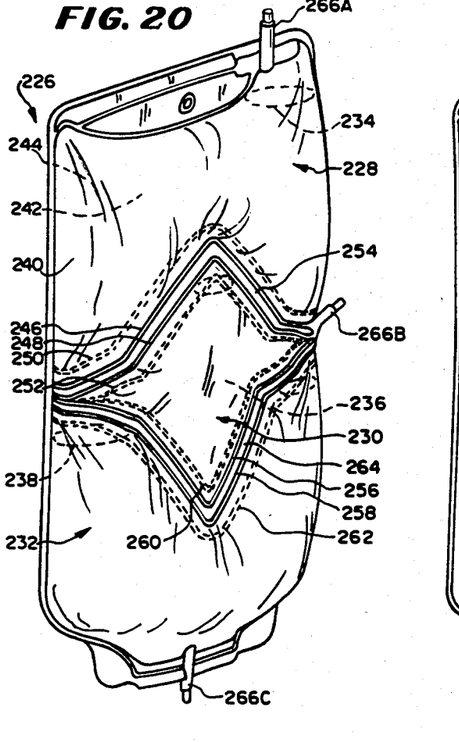
FIG. 20 is a perspective view of a further modified container.

Referring now to FIG. 20, there is shown a container 226 including first, second and third chambers 228, 230, 232 for the storage of first component 234, second component 236 and third component 238, respectively. The container 226 includes first, second and third sheets 240, 242, 244 as with containers 100, 192.

The first and second chambers 228, 230 are separated in the same manner as the first and third chambers 212, 216 in the container 192. The first and second chambers 228, 230 are separated by two breakable lines of securement 246, 248 and two permanent lines of securement 250, 252, thereby creating a fourth, barrier or buffer chamber 254 like the second, buffer chamber 214 in the container 192.

Similarly, the second and third chambers 230, 232 are separated by two breakable lines of securement 256, 258 and two permanent lines of securement 260, 262, defining a fifth barrier chamber 264.

Although the container 226 utilizes the double barrier configuration between component containing chambers as with the container 192, the three component container 226 may be constructed with single breakable and permanent lines of securement between chambers 228 and 230 and between chambers 230 and 232. However, the double barrier configuration which includes the fourth and fifth barrier or buffer chambers 254, 264, creates an extra assurance that there will be no transfer of one component from chamber to chamber during storage.

The barrier chambers, such as the chamber 214 in the container 192 and the chambers 254, 264 in the container 226 serves an additional, important function. These barrier chambers provide a visual test that no moisture transmission has occurred between the component containing chambers. By inspecting the barrier chambers immediately before mixing, the nurse or other operator can detect moisture in the barrier chambers. If moisture is found, the operator may dispose of the container because of the possibility of moisture transmission between component containing chambers. Only the portion of the first and third sheets about the lines of securement need be transparent in order to utilize this test procedure. However, even if not used as a test of moisture transmission, the barrier chambers provide added assurance that each component-containing chamber is secure.

The container 226 illustrated in FIG. 20, as well as the container 192 of FIGS. 21 and 22 may be manufactured in the same manner as shown in FIG. 18. Port means such as tubular port assemblies 266A, 266B, 266C may be provided to fill and/or provide access to each of the three chambers.

As discussed above, laminate structures employing virtually absolute moisture, air and sterility barriers, such as SARAN and foil, may be used when medical substances are stored in the containers. However, when laminate structures are used, the chances of maintaining a transparent or translucent sheet is decreased, both because of the greater variety of material used, e.g., foil, and due to the fact that there are various layers in the structure. It may, however, be desirable to visually inspect the contents of each chamber before mixing to assure the operator that the container contents are in good condition. This may be especially important when the container is used to store medical substances. It may be particularly desirable to inspect a chamber containing a dry powdered drug for the presence of any moisture whatsoever or, as a further example, a chamber containing amino acids, which is a superior growth medium.

A solution to this problem is illustrated in FIGS. 23–26. The container 268 shown in FIG. 24 includes first and third sheets 270, 274 and a second, diaphragm sheet 272. A tubular port assembly 276 communicates with the second chamber 280. The first chamber 278 and second chamber 280 are separated by a breakable line of securement 282 and a permanent line of securement 284. The breakable line of securement 282 may be the unique seal line 34.

Figures 24, 25, 26:
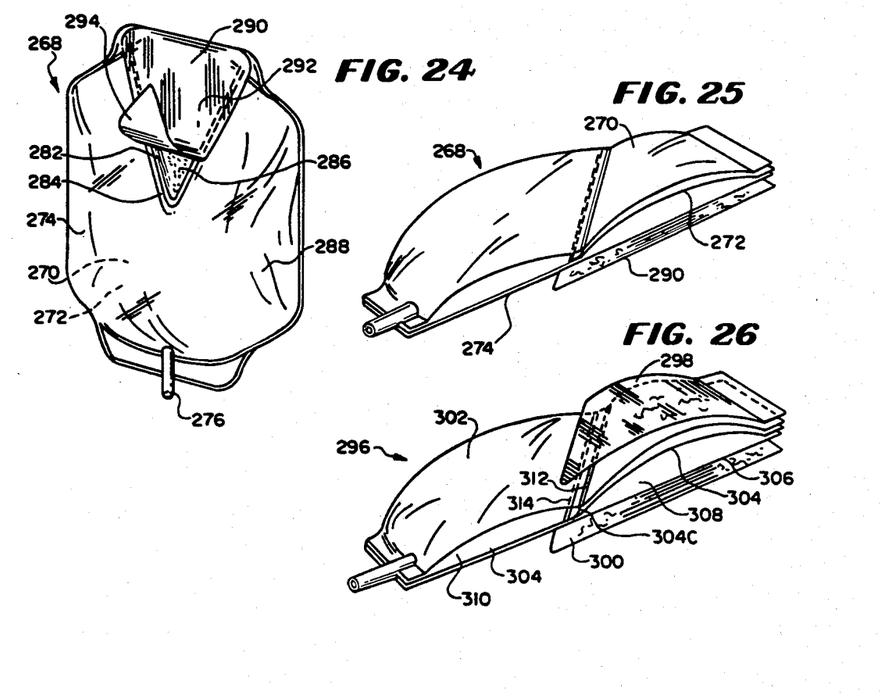
FIG. 24 is a perspective view of the container as in FIG. 23, with the peelable barrier means partially peeled away.
FIG. 25 is a cutaway view of the container shown in FIG. 23.
FIG. 26 is an alternate embodiment of the container shown in FIG. 23.

As an example, the first component 286 stored in the first chamber 278 may be a powdered drug and the second component 288 stored in the second chamber 280 may be a saline solution. In order to prevent moisture transmission from the second chamber 280 to the first chamber 278 and to minimize moisture and vapor transmission between the first and second chambers and the environment, the first and second sheets 270, 272 may be laminate structures including, for example, inner and outer surfaces of polyvinyl chloride and a middle layer of aluminum foil. In order to permit visual inspection of the container contents, the third sheet 272 may be transparent or translucent such as if made solely from a polyvinyl chloride formulation.

Over time, minute amounts of gas and moisture transmission may occur between the saline solution in the second chamber 280 and the environment, in such small amounts as to still be permissible under good medical procedure. However, the transmission of small amounts of moisture into the powder drug containing chamber 278 is not permissible. The container 268 therefore includes a peelable barrier segment 290 which may include an outer layer of aluminum foil 292 and an inner adhesive layer 294. The peelable barrier segment 290 is secured with the inner adhesive layer 294 to that portion of the third sheet 274 forming the exterior wall of the first chamber 278. Preferably, the peelable barrier segment 290 also extends over the breakable and permanent lines of securement 282, 284.

Before breaking the breakable line of securement 282 to mix the container contents, the nurse or other operator may simply peel away a portion or all of the peelable barrier segment 290 to inspect the powdered drug 286 through the third sheet 274.

FIG. 25 shows a cutaway view of the container 268, schematically illustrating the placement of the peelable barrier segment 290 over the third sheet 274.

FIG. 26 illustrates a container 296 which is an alternate embodiment of the container 268. The container 296 includes first, second and third sheets 302, 304 and 306, respectively. FIG. 26 schematically illustrates the placement of first and second peelable barrier segments 298, 300. The second peelable barrier segment 300 is, like the peelable barrier segment 290 of container 268, placed over that portion of the third sheet 306 which forms an exterior wall of the first chamber 308. The first peelable barrier segment 298 is placed over that portion of the first sheet 302 which is coextensive with that portion of the second sheet 304 forming the opposite wall of the first chamber 308. The container 296 may include a dry powdered drug as the first component (not shown) stored in the first chamber 308. The second chamber 310 may include a saline solution as the second component (not shown). The container 296 may also include the breakable and permanent lines of securement 312, 314. The embodiment shown in the container 296 may permit the use of relatively inexpensive materials such as polyvinyl chloride, for all three sheets, without the need for laminate structures. The peelable barrier segments 298, 300 will prevent any moisture or vapor transmission between the environment and the first chamber 308. The only area through which moisture may pass into the first chamber 308 is at the common portion 304C of the second, diaphragm sheet 304. Moisture transmission from the second chamber into the first chamber across the common portion 304C would only occur if the second sheet 304 did not include the proper barrier material. When the relatively inexpensive straight PVC is used for the second diaphragm sheet, this moisture transmission across a common portion 304C may be minimized by utilizing the double barrier construction including multiple breakable and permanent lines and a middle barrier or "no man's land" chamber such as the chambers 214, 254, 264 of the containers 192, 226. Also, there may be applications where the single barrier illustrated in FIG. 26 with a common portion 304C is permissible in conjunction with the peelable barrier segments 298, 300 such as where the first component must be maintained very dry but not absolutely dry or where the storage time is relatively short, minimizing any transmission problems across the common portion 304C.

High barrier property materials in high cost laminate structures for the first and third sheets of the containers 100, 166, 192, 226, 268, 296 may be eliminated and substituted with the relatively lower cost materials such as one layer PVC or EVA, even when medical substances such as powdered drugs are stored therein, and no peelable barrier segments need be used, if the entire container is packaged in a gas and moisture barrier overpouch. However, the use of the proper laminate structures as discussed above, and the use of a peelable barrier segment either in conjunction with or in substitution of the laminate structures, may totally eliminate the need for a moisture barrier overpouch, thus substantially reducing product cost while maintaining a high quality container suitable for even medical use.

The containers 100, 166, 192, 226, 268, 296 may all be used as a primary solution container for direct connection to a parenteral administration set. Stated differently, each of these containers may, after mixing of the components stored therein, be placed on an IV stand at a patient's bedside for direct infusion into the patient's venous system.

While several embodiments and features have been described in detail herein and shown in the accompanying drawings, it will be evident that various further modifications are possible without departing from the scope of the invention.

What is claimed is:

1. A container having two chambers for the separate storage and selective mixing of two components, comprising:
   (a) a first sheet including
      (i) a first inner surface of a thermoplastic material, and
      (ii) a first outer surface;
   (b) a second, diaphragm sheet including
      (i) a second inner surface of a thermoplastic material, said second inner surface having melt-flow characteristics substantially identical with the melt-flow characteristics of said first inner surface, and
      (ii) a second outer surface;
   (c) said second, diaphragm sheet sealed about at least a portion of its periphery to said first sheet and to a third sheet opposite said first sheet;
   (d) said first sheet and said third sheet sealed about their entire peripheries, forming the exterior wall of said container;
   (e) an externally, selectively, manually openable seal line between said first and said second, diaphragm sheets, said openable seal line extending across the width of said container, wherein a cross section taken through said seal line, perpendicular to said seal line at the cross section defines a seal, said seal formed by applied pressure and a focused energy source, which melts said first and second inner surfaces at said seal, said seal defining
      (i) a bead area of increased thickness at a break end of said seal, between said first and second inner surfaces, said bead area of increased thickness coextensive with said first and second inner surfaces along less than all of the surface of said bead area,
      (ii) a break line inwardly of said break end, between said second, diaphragm sheet and said bead area of increased thickness, the thickness of said seal at said break line being at the least not substantially less than the thickness of said second sheet, and
      (iii) an arcuate depression having a concave downward surface extending from substantially adjacent said break line to a minimum seal thickness point;
   (f) a permanent line of securement between said second and third sheets extending substantially parallel to and the length of said openable seal line;
   (g) at least said second, diaphragm sheet, said openable seal line, said permanent line of securement and said third sheet defining a first chamber for holding the first component;
   (h) at least said first sheet, said openable seal line, said permanent line of securement and said second, diaphragm sheet defining a second chamber for holding the second component;
   (i) barrier means secured to the exterior surface of the exterior wall of said container, at one of that portion of said third sheet which defines said first chamber and that portion of said first sheet which defines said second chamber;
   (j) wherein said barrier means comprises a virtually absolute barrier to at least one of gas, liquid and light;
   (k) whereby manual separation of said first and second sheets near said openable seal line will rupture said seal line and said second sheet, placing said first and second chambers in open communication.

2. The container as in claim 1, whereby said barrier means comprises a sheet having an inner adhesive surface securing said barrier sheet to said one of said third and first sheet portions, whereby said barrier sheet may be peeled away, exposing a portion of said one of said third and first sheet portions underneath said barrier sheet, said one of said third and first sheet portions having sufficient clarity to permit visual inspection of the contents of the underlying chamber.

3. The container as in claim 2, wherein said barrier means comprises a foil layer.

4. The container as in claim 3, wherein said foil layer is aluminum.

5. The container as in claim 1, further including port means communicating with at least one of said first and second chambers.

6. The container as in claim 1, further including second barrier means secured to the outside surface of said container exterior wall at the other of said third and first sheet portions.

7. The container as in claim 1, wherein said first and third sheets comprise polyvinyl chloride.

8. The container as in claim 1, wherein said first and third sheets comprise ethylene vinyl acetate.

9. The container as in claim 1, wherein said second sheet comprises a moisture barrier between said first and second chambers.

* * * * *